United States Patent [19]
Randell

[11] 3,792,935
[45] Feb. 19, 1974

[54] ROTARY-SHAFT LIQUID HANDLING MACHINE

[75] Inventor: Forrest Thomson Randell, Glascow, Scotland

[73] Assignee: Weir Pumps Limited, Glasgow, Scotland

[22] Filed: Aug. 21, 1972

[21] Appl. No.: 282,051

[30] Foreign Application Priority Data
Aug. 26, 1971 Great Britain.................. 40030/71

[52] U.S. Cl...................... 415/110, 277/27, 277/57
[51] Int. Cl. ..... F01d 11/00, F16j 15/40, F16j 15/48
[58] Field of Search............. 277/1, 27, 57; 415/110

[56] References Cited
UNITED STATES PATENTS
| | | | |
|---|---|---|---|
| 3,179,422 | 4/1965 | Phillips | 277/27 |
| 3,642,292 | 2/1972 | Dougherty | 277/1 |
| 3,141,677 | 7/1964 | Williams | 277/27 |
| 1,810,371 | 6/1931 | Baumann | 277/57 |

*Primary Examiner*—Carlton R. Croyle
*Assistant Examiner*—Louis J. Casaregola
*Attorney, Agent, or Firm*—John E. Becker

[57] ABSTRACT

A rotary-shaft liquid handling machine, for example a centrifugal pump, includes a rotary shaft extending through an opening in a wall of the machine casing, and an annular seal is provided between the shaft and the casing wall to close the opening and has rotor and stator portions on the shaft and casing wall respectively, which portions define an annular clearance. The clearance is comprised by an intermediate chamber and inlet and outlet ducts to and from the chamber, the arrangement being such that pressurized leakage fluid flows through the inlet duct to the chamber wherein the liquid vapourises and expands to inhibit leakage flow through the inlet duct.

7 Claims, 5 Drawing Figures

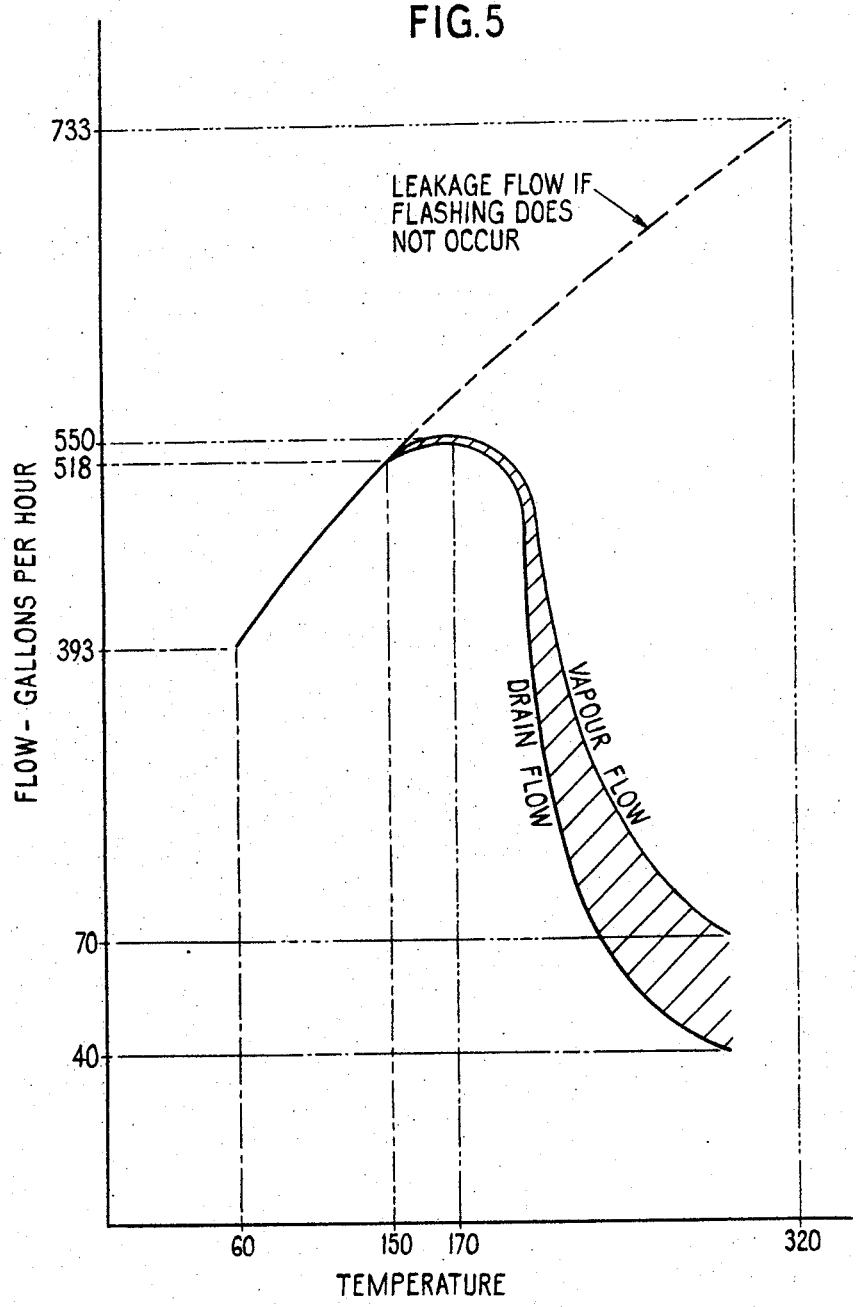

ROTARY-SHAFT LIQUID HANDLING MACHINE

This invention relates to rotodynamic pumps wherein the rotary impeller shaft extends through an opening in a wall of the pump casing and an annular seal is provided between the shaft and the casing wall to close the opening.

The object of the invention is to provide an improved annular seal.

According to one aspect of the present invention, in a rotary-shaft liquid handling machine of the aforesaid kind, a method of sealing the opening in the casing wall comprises passing a leakage flow of pressurised liquid from the casing into an inlet duct portion of an annular clearance defined between rotor and stator portions on respectively the shaft and the casing wall, passing the leakage flow from the inlet duct portion into an intermediate chamber of the clearance, vapourising at least a part of the leakage liquid in the intermediate chamber to inhibit leakage flow through the inlet duct portion, and discharging the vapour together with any liquid from the chamber into an outlet duct portion of the clearance.

According to another aspect of the present invention in a rotary-shaft liquid handling machine of the aforesaid kind the annular seal comprises rotor and stator portions on respectively the shaft and the casing wall and defining between them an annular clearance to permit leakage flow of pressurised liquid from the casing; said clearance including inlet and outlet annular ducts and an intermediate annular chamber communicating with the ducts whereby leakage liquid vapourises on discharge from the inlet duct into the chamber, the vapour formed on the chamber expands to inhibit leakage flow through the inlet duct, and vapour flows from the chamber through the outlet duct.

Preferably a plurality of intermediate annular chambers are provided linked by axial ducts.

Preferably the clearance is a labyrinth defined by axially extending interleaved formations on the rotor and stator portions and composed of axial ducts alternating with roadial chambers whereby a liquid/vapour mixture flows from one chamber to the next succeeding chamber and multi-stage inhibition of the leakage flow is effected.

Preferably sealing means are provided to seal vapour/liquid mixture present within the casing from ambient conditions.

Embodiments of the present invention will now be described by way of example with reference to the accompanying drawings in which:

FIG. 5 is a flow chart for leakage flow relative to fluid temperature for liquid flow through the glands of the pumps of FIGs. 1 and 4.

Figure 1:
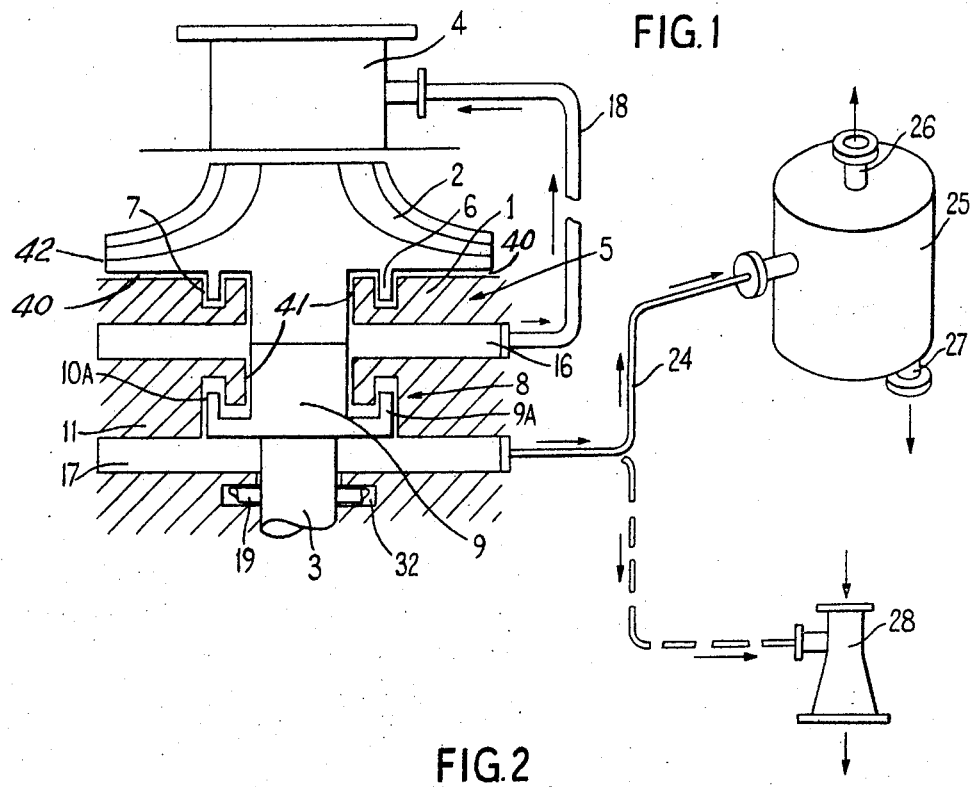
FIG. 1 shows a schematic cross-sectional elevation of a centrifugal pump including a gland seal according to one embodiment of the present invention.
Figure 2:
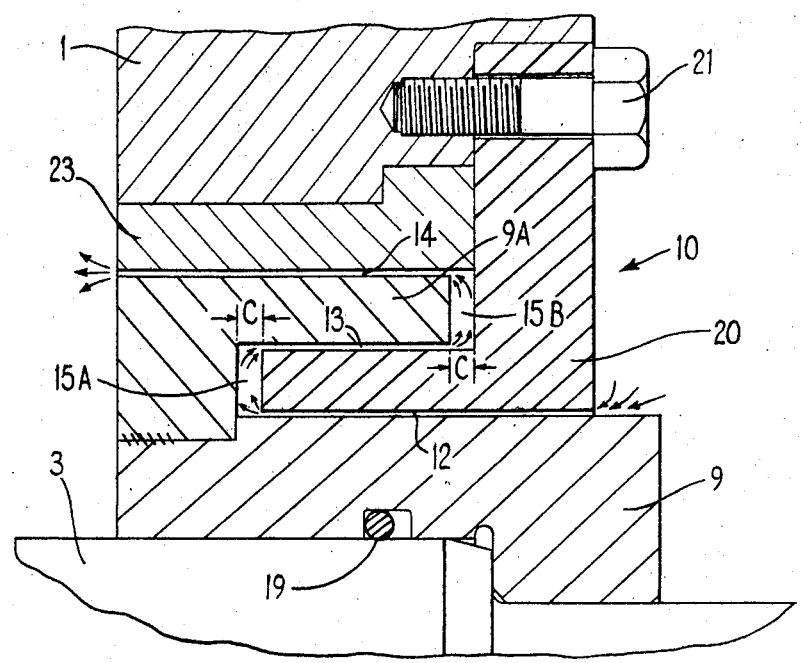
FIG. 2 shows in greater detail a cross-sectional elevation of one form of seal according to the present invention and for use in the pump of FIG. 1.

Referring to FIGS. 1 and 2, vertically disposed centrigual pump includes a casing 1 (only partially shown in FIG. 1) housing an impeller 2 mounted on a vertical rotating drive shaft 3, and an axial suction inlet 4 to the impeller 2. A sealing gland 5 is provided where the drive shaft 3 extends through the pump casing 1, and includes packing or wear rings 6 at the impeller and located in an annular recess 7 for sealing of leakage fluid from the impeller top 42. Additionally, a clearance labyrinth 8 is provided adjacent to but spaced from the impeller packing rings 6, and is comprised by a rotor portion 9 of the gland secured to the drive shaft 3 and a gland stator portion 10 (see FIG. 2) secured to an annular wall of the pump casing. In the arrangement shown in FIG. 2, the stator portion 10 comprises an axially flanged ring 20 secured to the casing 1 by bolts 21, and an annular lining plate 23 secured to a peripheral wall of the casing. The rotor portion 9 includes an axially extending annular flange 9A, while the stator 10 has a complementary recess 10A for receiving the annular flange 9A, so tht the labyrinth 8 is in this case a three stage axial restriction duct 12, 13, 14; an annular chamber 15A, 15B of increased running clearance C being provided between succeeding ducts 12, 13 of the laybrinth 8. An annular balance chamber 16 is provided in the annular casing wall 11 around the shaft 3 between the impeller packing rings 6 and the clearance labyrinth 8 to receive leakage fluid from the impeller packing rings 6 via radial and axial ducts 40, 41 and to pass the leakage fluid to the duct 12 of the labyrinth 8. Further, the labyrinth 8 discharges fluid to an annular outlet chamber 17 in the casing wall surrounding the shaft 3. A suitably sized return conduit 18 recycles liquid from the balance chamber 16 to the suction inlet 4 of the pump and the balance chamber 16 maintains a controlled low pressure outlet condition after high pressure breakdown of fluid across the impeller packing rings 6 and stabilises pressure fluctuations by means of the return conduit 18 to the suction inlet 4. The balance chamber 16 is consequently at pump suction pressure conditions so that "flashing" i.e., vapourisation of pump liquid) across the impeller packing rings 6 is avoided. Additionally, the interior of the pump casing 1 is sealed from ambient atmospheric conditons outwith the pump by a carbon sealing ring 19 or other low pressure seals surrounding the shaft 3 and housed in an annular recess 32 in an end wall of the pump casing 1.

Figure 3:
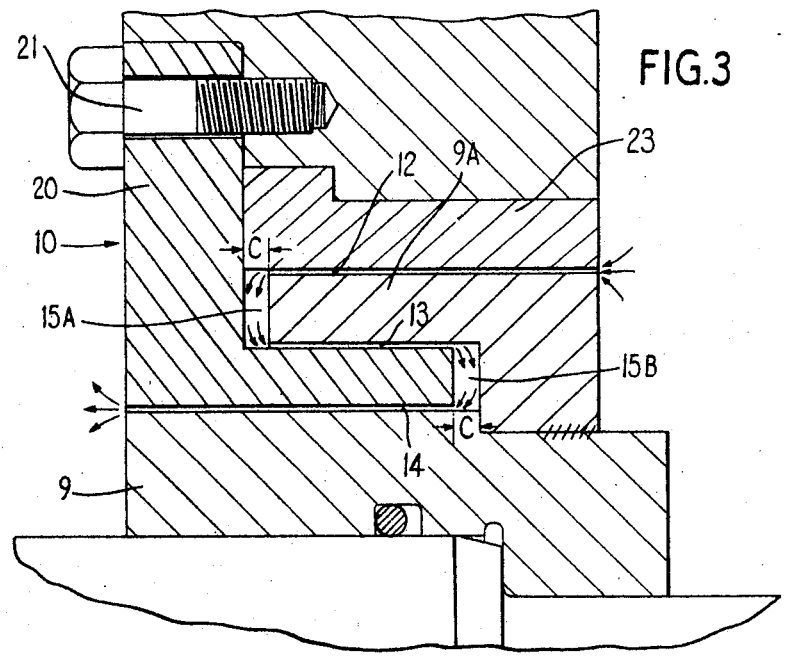
FIG. 3 shows a cross-sectional elevation of an alternative form of gland seal according to the present invention.

In FIG. 2 the labyrinth clearances 8 are arranged for radially outward flow of liquid (FIG. 2), but radial inward flow could be used as an alternative using the arrangement shown in FIG. 3. It is felt that radially inward liquid flow (FIG. 3) would be more satisfactory with hot suction conditions at the pump inlet 4. However, this arrangement may not be entirely satisfactory with pump inlet 4 of low pressure cold suction conditions.

The pump suction inlet 4 may be supplied from a hot deaerator storage tank and/or a cold reserve feed tank (not shown). It is necessary to dispose of the vapour/liquid discharge from the labyrinth 8, and this is achieved by discharging the vapour and liquid in a common conduit 24 to a flash chamber 25 wherein the vapour and liquid is separated and discharged through a vent 26 and a drain outlet 27. Alternatively as shown by the dashed line, the combined liquid/vapour can be passed to a quenching device 28 wherein the vapour is condensed, the liquid from the device 28 being discharged to a suitable drain tank.

Referring particularly to FIG. 2, in operation of the pump, liquid at the pump suction inlet 4 will be at a predetermined temperature and pressure of say 320°F and 100 psig, and the pump interior is sealed from atmospheric conditions by the sealing ring 19. Consequently, pressure will decrease from the inlet to the outlet of each labyrinth clearance 12, 13, 14. In particular, the labyrinth 8 has a three stage pressure drop corresponding to the stages 12, 13, 14 of the labyrinth. With liquid inlet conditions to the labyrinth of 320°F and 100 psig and with the labyrinth outlet at atmospheric pressure, a pressure drop will occur across each stage. Thus, in the intermediate chamber 15A at the outlet of the first axial stage 12, pressure conditions will be reduced to a value giving a saturation temperature less than the inlet temperature and at least a portion of the liquid passing into this intermediate chamber 15A will flash into a vapour. On flashing the vapour expands in the chamber 15A and chokes the leakage flow in the inlet duct 12. Vapour and liquid will pass via duct 13 to chamber 15B and similar flashing will take place in the chamber 15B to choke flow in duct 13; and vapour and liquid is discharged via duct 14 to the chamber 17 whence the vapour and liquid is passed to the chamber 25 or quenching device 28.

When the pump is operating at a high rotational speed of for example 10,000 RPM, due to the close running clearances in the ducts 12, 13, 14 a reheating effect will occur in the gland which will reduce the flash point of the liquid, for example from 212°F at atmospheric pressure to 170°F at the same pressure. Referring to FIG. 5, with a cold pump inlet suction of 60°F, the leakage flow occurring in the labyrinth 8 will thus rise to a peak value of 160°F to 170°F when flashing will occur, and the leakage will then be reduced to a minimum at 320°F as can be seen in the Figure wherein the leakage flow for no flashing occurence is represented by a dashed line and that occurring where flashing is present by thick lines. The greater the temperature difference above the conditions wherein instantaneous vapourisation (flashing) occurs the more efficient is the sealing arrangement in the labyrinth 8. When the pump is on stationary standby conditions, with a hot suction supply from the deaerator, flashing will still occur within the clearance labyrinth 8 to restrict the leakage flow; but ehere will be no reheating effect as in the running condition of the pump. On a cold suction supply from the feed tank the sealing effect of the labyrinth 8 will depend on the pressure at suction and this will depend on the head available from the cold reserve feed tank. For example, inlet suction conditions may be 20 psig at 120°F. However, although an increase in leakage will occur, the clearance labyrinth 8 will ensure that leakage is within suitable limits in this case.

To ensure adequate life the gland rotor and stator portions 9, 10 can be manufactured from heat treated stainless steel having a hardness differential of approximately 100 H.V. The running clearance in the labyrinth 8 can be arranged to be greater than all packing ring and bearing clearances within the pump and as such no contact between rotating and stationary components is present. For normal pump installations, the preferred design minimum diametral clearance can be increased quite substantially with only a small increase in vapour and drain leakage.

Figure 4:
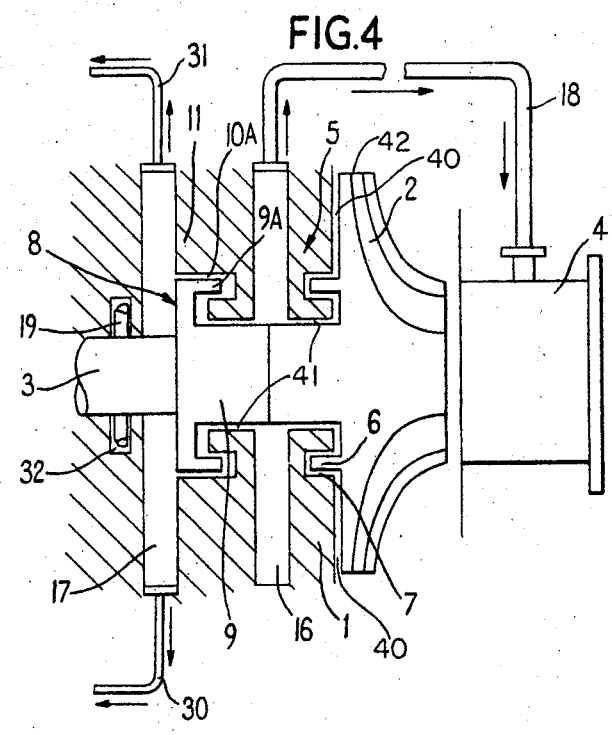
FIG. 4 shows schematically a cross-sectional elevation of a centrifugal pump according to a further embodiment of the present invention.

In the alternative embodiment shown in FIG. 4, the pump is arranged horizontally, but the sealing gland 5 and clearance labyrinth 8 is exactly in accordance with the FIG. 1 arrangement. However, for disposing of the vapour/liquid discharge from the chamber 17 a liquid drain conduit 30 is provided at a lowerpart of the outlet chamber 17, while a vapour conduit 31 is provided at an upper part of the chamber 17, the vapour being led to a glands condenser (not shown) or other suitable sink while the liquid drain flow is passed to a drain tank (not shown) or other suitable dump points.

The above labyrinth sealing arrangements according to the present invention can be very satisfactorily utilised in a boiler feed pump to provide an efficient seal between the pump suction and atmosphere. Any leakage in vapour or drain flow is sufficiently small over the operational range of the pump to be adequately disposed of within the system. The difference between the specific volume of steam and water ensures no substantial increase in flow over the sealing gland's life; and it is estimated that the running diametral clearances in the labyrinth which is say A when the gland is new can be increased to approximately 2A before replacement would be necessary.

The above described flashing labyrinth seal provides the following advantages:

1. A reduction in the axial length of the gland;
2. Efficient sealing;
3. No mating contact between the shaft and casing wall;
4. Increase in the period before maintenance is required;
5. The provision of convenient dumping stations for the vapour/liquid drain is facilitated;
6. Low maintenance costs; and
7. High speed applications improve sealing efficiency.

I claim:

1. A rotodynamic pump including a pump casing: a rotary shaft extending through an opening in a wall of the casing, an impeller mounted on the shaft, an inlet to the casing for feed liquid and a discharge from the casing for pumped liquid, and an annular seal between the shaft and the casing wall to close the opening; the annular seal comprising rotor and stator portions on respectively the shaft and the casing wall and defining between them a labyrinth of axially extending annular ducts alternating with radially extending annular chambers, the axial ducts having a fixed clearance and a first of said axial ducts constituting an inlet duct while a final axial duct of the labyrinth constitutes a fluid discharge duct; the labyrinth arrangement being such that a net radial fluid flow is provided therethrough; radial and axial passages in the casing for the passage of hot pressurised leakage liquid from the pump impeller to the axial inlet duct of the labyrinth whereby the hot leakage liquid passing through labyrinth vapourises in at least the final chamber of the labyrinth, due to reduction in pressure below the saturation value in the chamber, and vapour flows through the discharge duct to inhibit leakage flow through the labyrinth.

2. The seal according to claim 1, wherein the labyrinth is arranged fo net radially inward flow of fluid.

3. The seal according to claim 1, wherein the labyrinth is arranged for net radially outward flow of fluid.

4. The seal according to claim 1, wherein the labyrinth is defined by axially extending interleaved formations on the rotor and stator portions.

5. A centrifugal pump including a rotary impeller, an impeller casing, a drive shaft supporting the impeller and extending through an opening in a wall of the casing, a seal arrangement comprising a first fluid sealing device between the impeller and the casing and a second fluid sealing device spaced from the first and comprising rotor and stator portions on respectively the shaft and the casing wall and defining between them an annular clearance to permit leakage flow of pressurised liquid from the casing: said clearance including inlet and outlet annular ducts and an intermediate annular chamber communicating with the ducts whereby leakage liquid vapourises on discharge from the inlet duct into the chamber, the vapour formed on the chamber expands to inhibit leakage flow through the inlet duct, and vapour flows from the chamber through the outlet duct, and a fluid chamber located between the first and second sealing devices to receive fluid from the first sealing device and pass same to the second sealing device, and, means to maintain the fluid in the fluid chamer at pump suction pressure.

6. The pump according to claim 5, including a fluid discharge chamber for receiving fluid discharge from the discharge duct of the second sealing device.

7. The pump according to claim 5, wherein the clearance of the second sealing device is a labyrinth, defined by axially extending interleaved formations on the rotor and stator portions and composed of axial ducts alternating with radial chambers whereby vapourisation occurs in at least the final chamber of the labyrinth and vapour flows through the annular outlet duct of the labyrinth to inhibit leakage flow through the labyrinth, the labyrinth being arranged for net radial fluid flow therethrough.

* * * * *